US008769680B2

(12) United States Patent
 Stading

(10) Patent No.: US 8,769,680 B2
(45) Date of Patent: Jul. 1, 2014

(54) ALERT PASSWORDS FOR DETECTING PASSWORD ATTACKS ON SYSTEMS

(75) Inventor: Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 10/460,432

(22) Filed: Jun. 12, 2003

(65) Prior Publication Data
 US 2004/0255155 A1   Dec. 16, 2004

(51) Int. Cl.
 *G08B 23/00* (2006.01)
 *G06F 12/14* (2006.01)

(52) U.S. Cl.
 USPC .................................. 726/23; 726/22; 726/25

(58) Field of Classification Search
 USPC ................................................ 726/25, 22, 23
 See application file for complete search history.

(56) References Cited

U.S. PATENT DOCUMENTS

| 4,719,566 | A |  | 1/1988 | Kelley | 364/200 |
| 5,204,966 | A | * | 4/1993 | Wittenberg et al. | 726/6 |
| 5,278,901 | A | * | 1/1994 | Shieh et al. | 726/22 |
| 5,606,615 | A |  | 2/1997 | Lapointe et al. | 380/25 |
| 5,896,497 | A |  | 4/1999 | Halstead | 395/186 |
| 6,144,959 | A |  | 11/2000 | Anderson et al. | 707/9 |
| 6,345,283 | B1 | * | 2/2002 | Anderson | 1/1 |
| 6,405,318 | B1 |  | 6/2002 | Rowland | 713/200 |
| 6,647,400 | B1 | * | 11/2003 | Moran | 1/1 |
| 6,895,383 | B2 | * | 5/2005 | Heinrich | 705/7 |
| 6,996,718 | B1 | * | 2/2006 | Henry et al. | 713/182 |
| 6,996,843 | B1 | * | 2/2006 | Moran | 726/23 |
| 7,032,114 | B1 | * | 4/2006 | Moran | 713/187 |
| 7,200,754 | B2 | * | 4/2007 | Walters | 713/182 |
| 7,581,245 | B2 | * | 8/2009 | Rojewski | 726/6 |
| 7,748,040 | B2 | * | 6/2010 | Adelstein et al. | 726/25 |
| 2002/0078382 | A1 | * | 6/2002 | Sheikh et al. | 713/201 |
| 2002/0107927 | A1 |  | 8/2002 | Gallant |  |
| 2002/0112183 | A1 |  | 8/2002 | Baird, III et al. |  |
| 2002/0129264 | A1 | * | 9/2002 | Rowland et al. | 713/200 |
| 2003/0046128 | A1 | * | 3/2003 | Heinrich | 705/7 |

(Continued)

FOREIGN PATENT DOCUMENTS

| JP | 2002-041472 | 2/2002 | G06F 15/00 |
| JP | 2002-197065 | 7/2002 | G06F 15/00 |

OTHER PUBLICATIONS

Unix Password Crackers. Openwall. http://passwords.openwall.net/unix-crypt.*
Alec Muffett. Crack Version v5.0 User Manual. Dec. 1996. http://www.crypticide.com/alecm/security/c50a.txt.*

(Continued)

*Primary Examiner* — Tamara T Kyle
(74) *Attorney, Agent, or Firm* — Brevetto Law Group

(57) ABSTRACT

Detecting attacks on secured computer resources, including gathering user security data for a user having a user password protecting resources on a computer system; generating an alert password that is easier to crack than the user password; and deploying the alert password on the computer system for use in detecting password attacks on the protected resources. Generating an alert password that is easier to crack than the user password in some embodiment further comprises: generating an alert password having a cracking difficulty; attempting to crack the alert password and the user password until one cracks; and if the user password cracks first, repeatedly carrying out the following steps so long as the user password continues to crack first: generating an alert password having a reduced cracking difficulty; and attempting to crack both the alert password having a reduced cracking difficulty and the user password until one cracks.

13 Claims, 6 Drawing Sheets

(56) References Cited

U.S. PATENT DOCUMENTS

| | | |
|---|---|---|
| 2003/0145224 A1* | 7/2003 | Bailey .................. 713/201 |
| 2003/0145226 A1* | 7/2003 | Bruton et al. .......... 713/201 |
| 2004/0010718 A1* | 1/2004 | Porras et al. .......... 713/201 |
| 2004/0019803 A1* | 1/2004 | Jahn ...................... 713/201 |
| 2004/0250139 A1* | 12/2004 | Hurley ................. 713/202 |
| 2005/0071645 A1* | 3/2005 | Girouard et al. ...... 713/183 |
| 2005/0114186 A1* | 5/2005 | Heinrich ................... 705/7 |
| 2006/0010493 A1* | 1/2006 | Piesco et al. ............ 726/23 |

OTHER PUBLICATIONS

Alec D.E. Muffett. Crack Version 4.1. A Sensible Password Checker for Unix. Mar. 3, 1992. ftp://ftp.cert.dfn.de/pub/tools/password/Crack/Crack.README.gzip.*

John the Ripper. Wikipedia. http://en.wikipedia.org/wiki/John_the_Ripper#Attack_types.*

John the Ripper—Password Cracker. README. Dec. 2, 1998. http://www.bebits.com/app/2396.*

Barbara et al., "ADAM: A Testbed for Exploring the Use of Data Mining in Intrusion Detection," ACM Sigmod Record, Dec. 2001, pp. 15-24, vol. 30, Issue 4, ACM Press, New York, U.S.A.*

Ding et al., "Undetectable On-Line Password Guessing Attacks," ACM SIGOPS Operating Review, Oct. 1995, pp. 77-86, vol. 29, Issue 4, ACM Press, New York, U.S.*

IBM TDB 05-93 v36 n05 p. 309-312: "Alert PIN for Personal Banking Terminals."

RD 03-1999 n41989 p. 390: "SOS Beacon for Stolen Systems."

RD 05-2000 n433110 p. 916: "Persistent DVD Play Options."

* cited by examiner

ALERT PASSWORDS FOR DETECTING PASSWORD ATTACKS ON SYSTEMS

BACKGROUND OF THE INVENTION

1. Field of the Invention

The field of the invention is data processing, or, more specifically, methods, systems, and products for generating an alternate password for access to a resource.

2. Description of Related Art

Passwords are useful elements of computer security systems. Passwords are used to secure access to computer resources. If a password is compromised, an unauthorized person can masquerade as a valid user and gain access to critical resources.

A password attack is an attempt to infer, obtain, or decrypt ("crack") a legitimate user's password to gain unauthorized access to secure computer resources. Readily available password dictionaries and password cracking programs combine to make passwords very vulnerable. The term 'crack' is used in this specification to refer to any unauthorized access to a resource protected by computer security systems by guessing, inferring, decrypting, or otherwise improperly obtaining and using a password. Inferring a password in this context can include not only real time guesses typed into a keyboard on a computer terminal but also automated guessing carried out by sophisticated password cracking programs comprised of many password cracking algothms operating on the basis of on-line dictionaries including personal information of users having accounts on target systems.

Passwords are attacked in several ways. One way passwords are attacked is a so-called 'dictionary' attack where an unauthorized user makes automated attempts to gain access to a secured resource by using words from a dictionary as trial passwords until one works. Dictionary attacks are made easier when an user picks a password based upon information descriptive of the user, such as, for example, the user's birth date written backwards, a concatentation of the user's address street name and number, the user's mother's maiden name, the user's daughter's name, the user's pet's name, and so on. Unauthorized users can gain access to large quantities of personal information, from Internet resources, from telephone books, from credit agencies, even from a Unix 'finger' command. Such personal information can be included in a password cracking dictionary for use by well-known password cracking programs or password cracking programs developing ad hoc by persons seeking unauthorized access to computer resources.

Examples of readily available password cracking programs include:

'John the Ripper,' available from the Openwall Project at www.openwall.com,

'Crack,' available from Alex Muffet at www.crypticide.org/users/alec,

'Brutus,' available from HooBieNet at www.hoobie.net/brutus,

'NT Password,' available from LastBit Software at http://lastbit.com, and

'L0phtCrack,' available from L0pht Heavy Industries, Inc., at www.10pht.com/10phtcrack/dist/10phtcrack25.exe.

Although password cracking programs are used legitimately to test and evaluate computer security, to find weaknesses that need to be remedied, in fact, password cracking programs are also used by persons seeking unauthorized access through password attacks. There is an ongoing need in the art for improved methods of detecting such attacks.

SUMMARY OF THE INVENTION

Exemplary embodiments of the invention include methods for detecting attacks on secured computer resources. Exemplary embodiments include generating, for a user having a user password protecting resources on a computer system, an alert password that is easier to crack than the user password. Such embodiments include deploying the alert password on the computer system for use in detecting password attacks on the protected resources. Alert passwords optionally are genertated in dependence upon user security data.

In exemplary embodiments of the invention, generating an alert password that is easier to crack than the user password includes generating an alert password having a cracking difficulty, and attempting to crack both the alert password and the user password until at least one of them cracks. Typically, if the user password cracks first, embodiments include repeatedly carrying out the following steps so long as the user password continues to crack first: generating an alert password having a reduced cracking difficulty, and attempting to crack both the alert password having a reduced cracking difficulty and the user password until one of them cracks. In such embodiments, generating an alert password having a cracking difficulty comprises selecting a cracking difficulty, selecting a password generating algorithm in dependence upon the cracking difficulty, and generating an alert password by use of the selected algorithm.

In exemplary embodiments of the invention, generating an alert password having a reduced cracking difficulty includes selecting a reduced cracking difficulty, selecting a password generating algorithm in dependence upon the reduced cracking difficulty, and generating an alert password by use of the selected algorithm. In such embodiments, generating an alert password that is easier to crack than the user password includes cracking the user password and measuring the time required to crack the user password, generating an alert password having a cracking difficulty, and cracking the alert password and measuring the time required to crack the alert password. Typically, if the time required to crack the user password is less than the time required to crack the alert password, embodiments include repeatedly carrying out the following steps until the time required to crack the alert password is less than the time required to crack the user password: generating an alert password having a reduced cracking difficulty, cracking the alert password having a reduced cracking difficulty, and measuring the time required to crack the alert password having a reduced cracking difficulty.

In exemplary embodiments of the invention, generating an alert password that is easier to crack than the user password includes establishing a timeout period, and generating an alert password having a cracking difficulty. Such embodiments include attempting, during the timeout period, to crack both the alert password and the user password. Typically, if neither password cracks during the timeout period, embodiments include repeatedly carrying out the following steps until the alert password cracks during the timeout period: generating an alert password having a reduced cracking difficulty, and attempting during the timeout period to crack the alert password having a reduced cracking difficulty.

In exemplary embodiments of the invention, generating an alert password that is easier to crack than the user password includes setting a minimum cracking difficulty, generating an alert password having a cracking difficulty greater than the minimum cracking difficulty, and attempting to crack both the alert password and the user password until at least one of them cracks. Typically, if the user password cracks first, embodiments include repeatedly carrying out the following steps so long as the user password continues to crack first and a reduced cracking difficulty remains greater than the minimum cracking difficulty: reducing the cracking difficulty, generating an alert password having the reduced cracking difficulty, and attempting to crack both the alert password having the reduced cracking difficulty and the user password until one of them cracks. Such embodiments include prompting the user to enter a new user password having a greater cracking difficulty if the reduced cracking difficulty of the alert password becomes equal to or less than the minimum cracking difficulty.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for generating an alternate password for access to a resource. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Detecting Password Attacks

Figure 1:
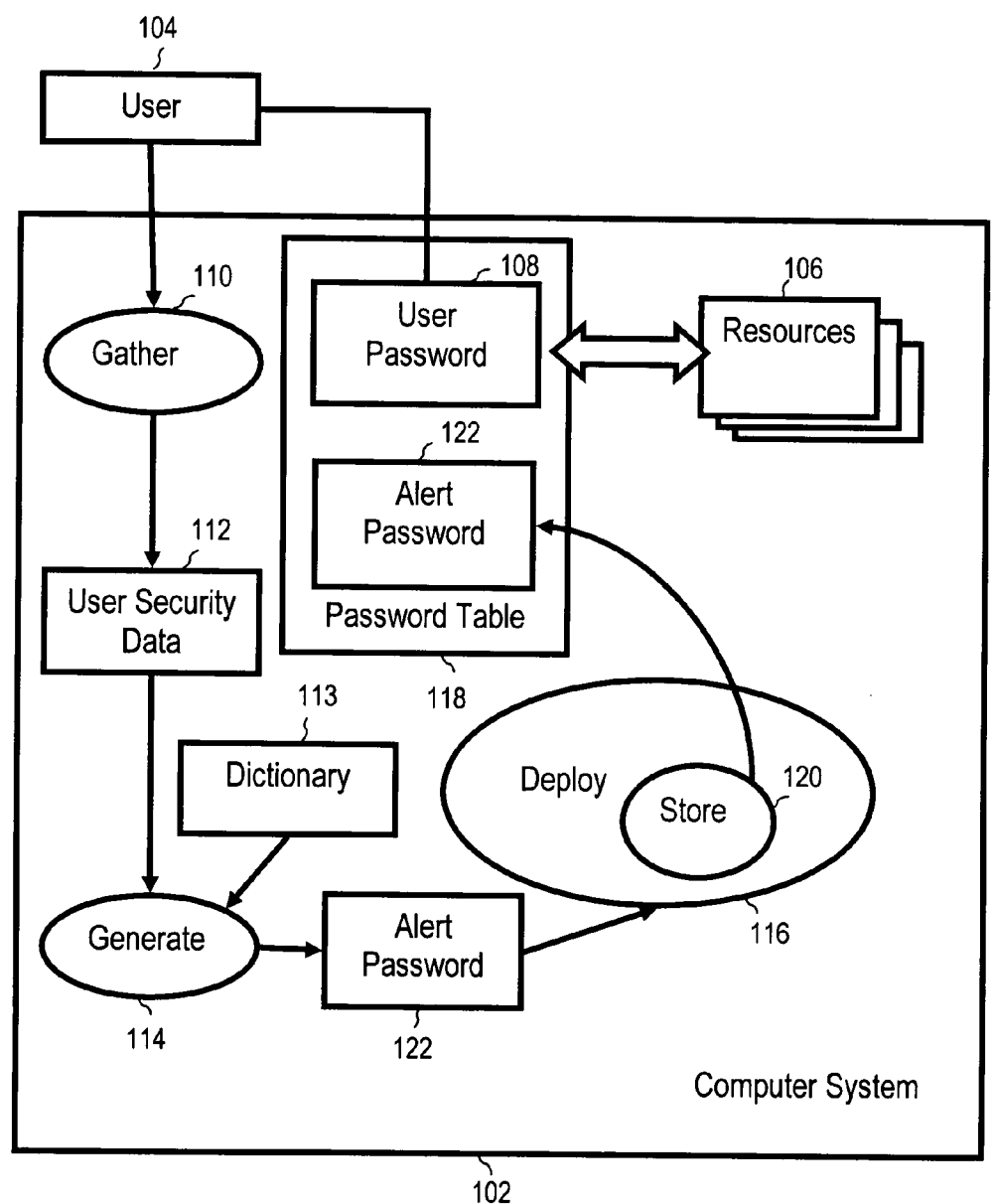
FIG. 1 sets forth a data flow diagram illustrating a method for detecting attacks on secured computer resources.

FIG. 1 sets forth a data flow diagram illustrating a method for detecting attacks on secured computer resources that includes generating (114), for a user (104) having a user password (104) protecting resources (106) on a computer system (102), an alert password (122) that is easier to crack than the user password. The computer system (102) is any computer system having an operating system or security applications software capable of storing users' personal information according to user identification. Such storage can be accomplished by use of a password table such as that shown at reference (118) on FIG. 1. Or the storage may be arranged in other tables as will occur to those of skill in the art. Generating (204) an alert password (122) having a cracking difficulty (202), in this example, is carried out by use of user security data (112), in dependence upon a dictionary (113), or in other ways.

Resources (106) are any information or physical item access to which is affected by user passwords or security software operating in dependence upon user passwords, including files, programs, networks, and sub-networks. A common kind of resource is a file, but resources include dynamically-generated query results, the output of CGI scripts, dynamic server pages, documents available in multiple languages, as well as physical objects access to which is controlled by passwords, such as, for example, computer systems themselves, wide area networks, local area networks, laboratory doors with computer-controlled security locks, and so on. It is often useful to think of resources as similar to files—but more general in nature. Files as resources include web pages, graphic image files, video clip files, audio clip files, and so on. As a practical matter, in an area of broad concern, most resources password-protected on the Internet are currently either files or server-side script output. Server side script output includes output from CGI programs, Java servlets, Active Server Pages, Java Server Pages, and so on.

A password is secret series of characters used to authenticate users' requests for access to computer resources. Passwords enable a user to gain access to a computer resource in effect by identifying the user as a user who is authorized to access the resource. On multi-user computer systems, each user must enter his or her password before the computer will respond to commands. The password helps ensure that unauthorized users do not access the computer. In addition, individual resources such as particular data files and programs may require separate additional passwords for access. Ideally, a password should be something difficult to guess. In practice, most people choose a password that is easy to remember, such as their name or their initials. This is one reason password-guessing attacks based upon dictionaries represent such a large risk to computer security.

This disclosure discusses two kinds of passwords. "User passwords" (108) are the usual passwords of computer security systems, provided by the users themselves through data entry in response to system prompts, and stored in usual password files, encrypted or shadowed according to the particular operating system and the security features installed upon the operating system. "Alert passwords" (122) are passwords generated according to embodiments of the present invention. Users typically are not involved in the generation of alert passwords. Users in fact are generally unaware that alert passwords are created or that they exist at all.

User security data (112) is any and all data descriptive of a user, including for example, the user's names, addresses including room numbers and suite numbers, telephone numbers, mother's maiden name, children's names, social security number, age, birthdate, spouse's names, pets names, childrens' and spouses' birthdates, hobbies, favorite authors, employment history, and so on, as will occur to those of skill in the art. Such user security data is widely available to attackers from a variety of sources, phone books, company directories, and on-line sources such as the 'whois' service from domain name registries, the 'finger' service available from less secure servers and many networks without firewalls, other sources on the World Wide Web, and other sources as will occur to those of skill in the art. User security data can be gathered by prompting the user to enter the user security data through a computer terminal into computer memory.

User security data for legitimate use according to embodiments of the present invention can be gathered for use in security systems according to embodiments of the present invention in many ways, including, for example, prompting users directly to enter such security data or acquiring such security data from on-line resources. The possession of such security data in quantity is normally risky, particularly if it falls into the wrong hands. It is a surprising and somewhat paradoxical aspect of embodiments of the present information, that as more user security data is gathered for use in such embodiments, the security of the embodiments is increased rather than decreased. This is true because security systems implemented according to embodiments of the present invention typically utilize such information to generate alert passwords designed to resemble those that are used by unauthorized persons for password cracking attacks. In addition, it is an advantage of security systems according to many embodiments of the present invention that such security data, to the extent that it is retained or stored in computer memory, is not retained in plain text, but instead is maintained only in encrypted form. Moreover, it is an advantage of security systems according to many embodiments of the present invention that such security data is not retained in storage on the systems, but instead is used to compile one or more alert passwords and then promptly discarded.

The password cracking attacks of concern are of the kind sometimes called 'dictionary attacks' or 'password guessing attacks.' That is, dictionaries are used by cracking programs as input data for password guessing algorithms. Passwords guessed by the cracking programs are then used in attacking computer security systems. This approach, unfortunately, is very successful. It only takes one success to break into a secured computer system. Cracking programs using small dictionaries have been shown to be successful as much as 20% of the time. Large dictionaries can contain many megabytes of words and word stems from most written languages. Dictionaries can contain all the kinds of user security data described just above and more, names, addresses, numbers, hobbies, favorite authors, and so on.

Deploying (116) an alert password is carried out in typical embodiments in a fashion similar to the deployment of ordinary user passwords, except that the deployment of an alert password is usually transparent to users. Alert passwords are deployed, for example, by storing them in password tables similar to the password tables in which ordinary user passwords are stored, such as, for example, the well-known /etc/passwd in Linux systems. Alert passwords, in fact, can be stored in the very same table in which ordinary user passwords are stored, in operating systems amenable to such storage. Alert passwords, like ordinary user passwords, in support of appropriate retrieval when needed, are typically stored in association with user identification or resource identification for a user or a resource with which a user password is used to control access. Alert passwords in some embodiments are stored in plain text, hashed, encrypted, shadowed, and so on as will occur to those of skill in the art.

An alert password is used in detecting password attacks when a password submitted with a request for access to a resource does not match the user password governing access to the resource. That is, when the submitted password matches the user password, the use of alert passwords according to embodiments of the present invention generally is not invoked. Because password guessing attacks are evidenced by failures of submitted passwords to match user passwords, alert passwords, according to embodiments of the present invention, are typically brought into use to detect an attack when submitted passwords fail to match user passwords.

Because alert passwords, according to embodiments of the present invention, generally are easier to guess (or 'crack') than user password protecting a resource, a failure of a submitted password to match a governing user password is considered evidence of an attack when the submitted password matches an associated alert password. An 'associated alert password' in this context is an alert password associated in tables or other data structures with a user password protecting a resource. Typically in systems using alert passwords to detect attacks, when a submitted password fails to match the user password protecting a resource, the submitted password is compared with the associated alert password. If the submitted password matches the alert password, the system concludes that it is under attack and takes steps accordingly. Steps in response to an attack can include, among others as will occur to those of skill in the art: tracking and logging actions of an attacker, notifying systems administrators of the attack, altering permissions on targeted user accounts to limit access to resources, suspending or terminating all permissions on a user account, and attempting to trace the attack back to its source and identify the attacker.

In order to give a security system time to take steps like tracking, logging, notifying, tracing, and identifying an attacker, steps in response to an attack often advantageously include logging an attacker onto a honeypot. A honeypot is a decoy server, specially designed and segregated so as to appear to attackers that they are logged onto a live system. Honeypots are particularly useful responses to attack because they give system administrators time and opportunity to study attackers' activities, monitor how they are able to break into a system, and identify attackers if possible. Honeypots are designed to mimic systems and resources that an attacker would like to break into and at the same time limit access to an attacked network as a whole. If a honeypot is successful, attackers will not know that the attacker is being decoyed and monitored. In addition, by presenting apparent root access to an attacker, honeypots prevent the attacker from gaining actual root access to a system and at the same time give system administrators an opportunity to identify and apprehend the attacker. Moreover, honeypots give system administrators the opportunity to learn how to improve system security by watching attackers as they exploit vulnerabilities of a system.

Figure 2:
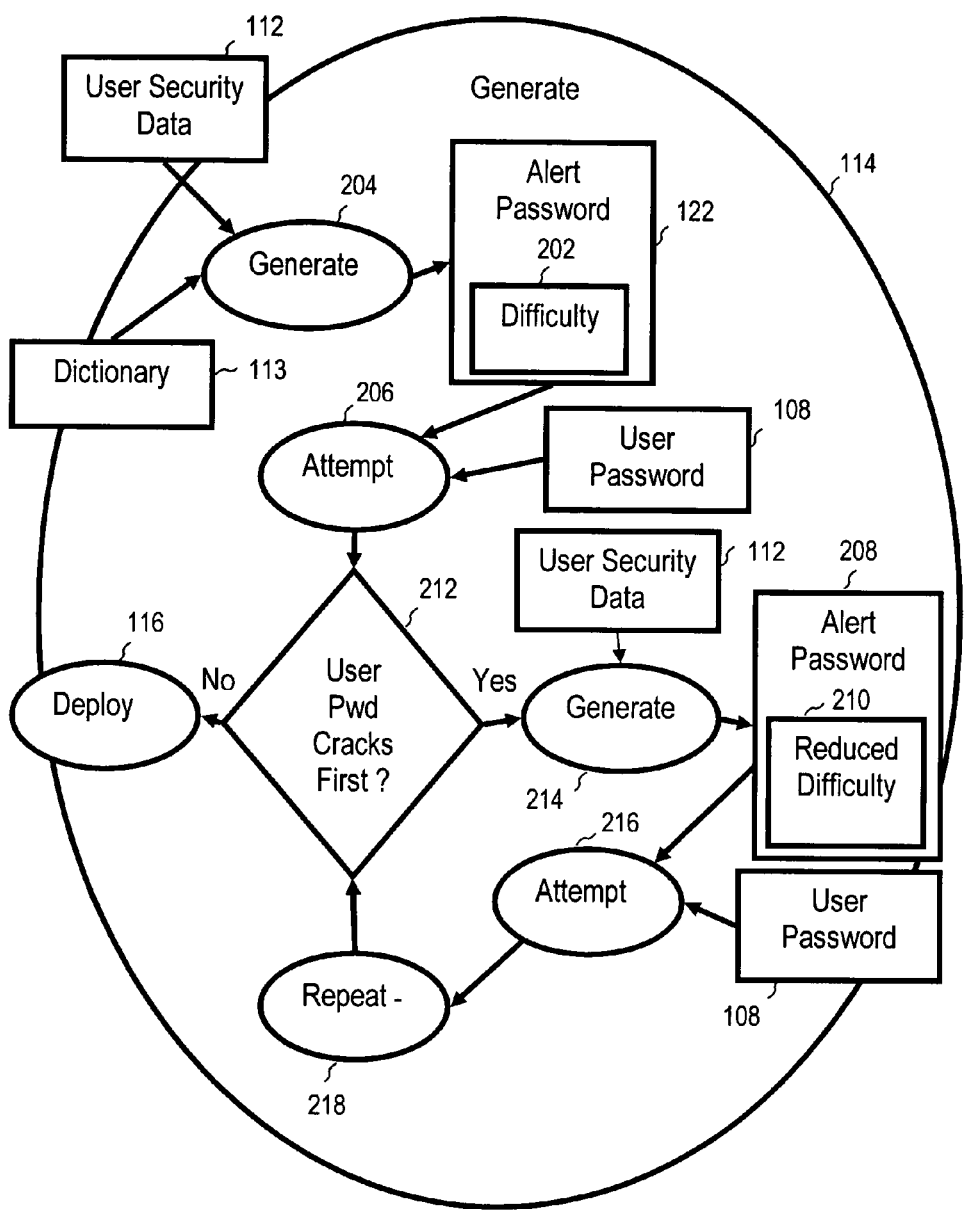
FIG. 2 sets forth a data flow diagram illustrating a method of generating an alert password that is easier to crack than a user password.

FIG. 2 sets forth a data flow diagram illustrating a method of generating (114) an alert password that is easier to crack than the user password. The method of FIG. 2 includes generating (204) an alert password (202) having a cracking difficulty (202). Alert passwords having cracking difficulties are generated in various ways in security systems according to embodiments of the present invention, including, for example, generating them in dependence upon user security data (112) or by user of dictionaries (113). Generating (204) an alert password (202) having a cracking difficulty (202) is explained with reference to FIG. 3.

Figure 3:
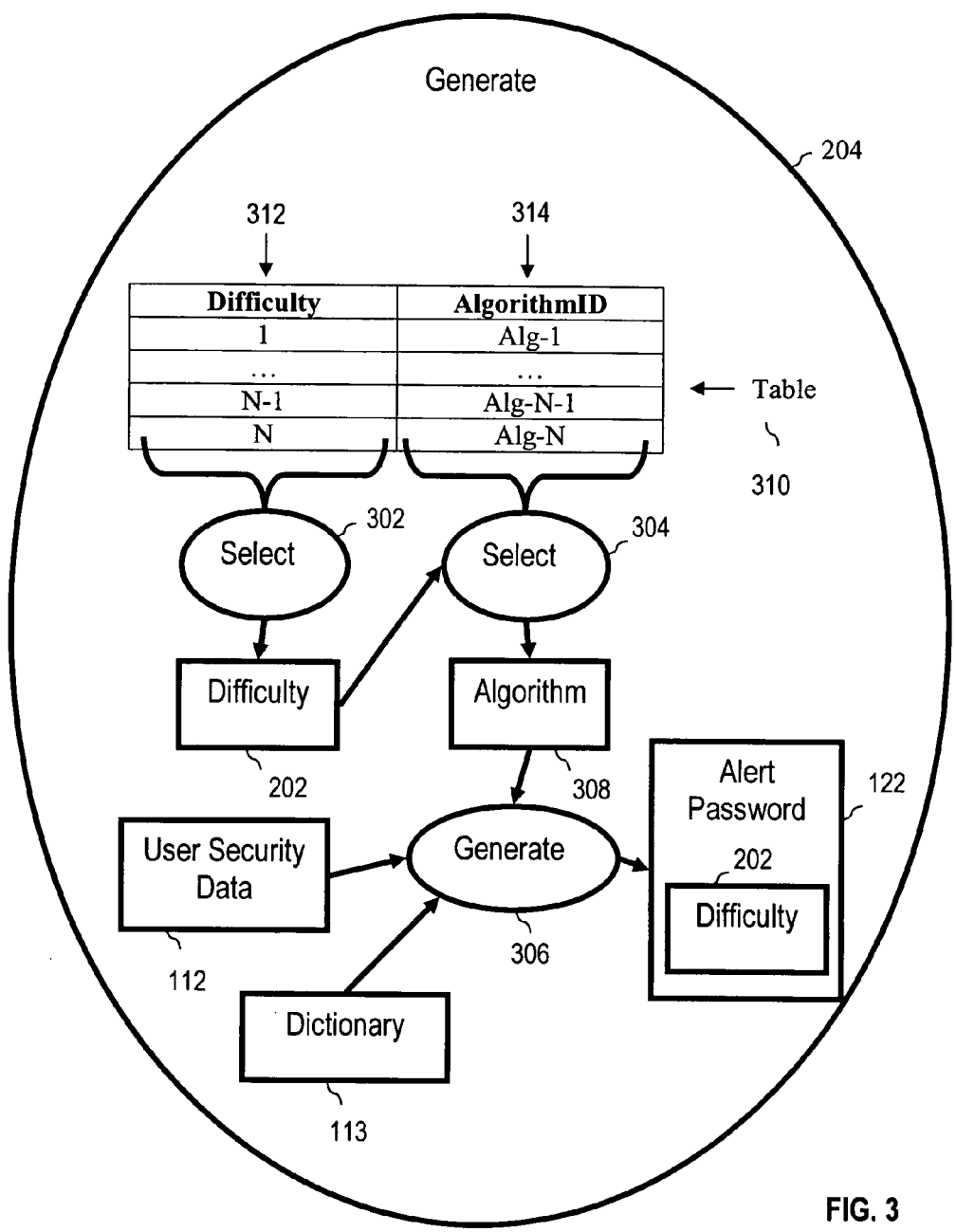
FIG. 3 sets forth a data flow diagram illustrating a method of generating an alert password having a cracking difficulty.

FIG. 3 sets forth a data flow diagram illustrating an exemplary method of generating (204) an alert password having a cracking difficulty where the method includes selecting (302) a cracking difficulty (202). Selecting (302) a cracking difficulty (202), according to the method of FIG. 3, is carried out, for example, by use of a table (310) comprising two columns, one column representing cracking difficulty (312) and one column for algorithm identification (314). The table can be implemented as a database table, a set, a hashtable, and so on, as will occur to those of skill in the art. The cracking difficulty (312) in this example is encoded as sequential integers, where lower valued integers represent easier cracking difficulties and higher values represent higher cracking difficulties. Selecting (302) a cracking difficulty (202) in this example is carried out by selecting an integer value between the lowest value of cracking difficulty available, in this example, '1,' and the highest available cracking difficulty, in this example, 'N.'

Here is an exemplary list of password generating algorithms that generate passwords of increasing cracking difficulty:
1. Randomly select a word from an on-line dictionary for use as a password, with no algorithmic combinations.
2. Make algorithmic combinations of input data, such as, concatenate into a string the user's first name and last name and use the first eight letters of the string as the password.
3. Retrieve and use as the password the first of the following to comprise at least ten characters: the user's hobby, the user's favorite author, the user's oldest child's first name.
4. Express the user's birthdate as six numeric digits and reverse them; express the user social security number as nine numeric digits and reverse them; concatenate the two, forming a fifteen digit password.
5. Form a twenty digit password by choosing twenty characters randomly from a list of 100 alphabetic characters, numeric digits, and special characters such as punctuations or control characters, !, @, #, $, %, and so on, so that at least 5 of the twenty characters are alphabetic, at least 5 are numeric, and at least 5 are special characters, punctuation, or control characters.

Password generated by the first example algorithm would be cracked quickly by any dictionary-based cracking program. Passwords generated by the second example would be cracked by any cracking program having pertinent personal security data in its supporting dictionary and also having the capability of algorthmically combining dictionary input to form test passwords for attack. Passwords generated according to the fifth example are quite difficult to crack, because the algorthm generates long passwords with no elements found in any dictionary or in any personal security data. In this case, the use of five examples is only for explanation, not for limitation. Various embodiments of the invention use any number or combination of password generating algorithms as will occur to those of skill in the art.

The method of FIG. 3 includes selecting (304) a password generating algorithm (308) in dependence upon the cracking difficulty (202). The table (310) of FIG. 3 is organized, sorted, or indexed on cracking difficulty. The algorithm identifications (314) are implemented as program names, class names, references to algorithm objects, or otherwise as will occur to those of skill in the art. Having selected a cracking difficulty, selecting (304) a password generating algorithm (308) in dependence upon the cracking difficulty (202) is carried out in this example by retrieving from table (310) an algorithm identification (308) that corresponds to the selected cracking difficulty (202).

The method of FIG. 3 also includes generating (306) an alert password (122) by use of the selected algorithm (308). Generating (306) an alert password (122) by use of the selected algorithm (308) is carried out, for example, by executing the algorithm identified by the selected algorithm identification (308). If the algorithm identification (308) is a program name, generating (306) an alert password (122) by use of the selected algorithm (308) is carried out by calling the program. If the algorithm identification (308) is a class name, generating (306) an alert password (122) by use of the selected algorithm (308) is carried out by compiling the class and executing a member method within it. If the algorithm identification (308) is a reference to an algorithm object, generating (306) an alert password (122) by use of the selected algorithm (308) is carried out by calling a member method in the referenced object. And so on.

The method of FIG. 2 includes attempting (206) to crack both the alert password (122) and the user password (108) until at least one of them cracks. Recall that this procedure overall is generating (114) an alert password that is easier to crack than the user password. In typical embodiments of the present invention, therefore, the cracking difficulty of the generating algorithm measures the cracking difficulty of the alert password. The user provided the user password, however, so there is yet no measure of its cracking difficulty. That is, the user determined the user's password according to a procedure or algorithm that is unknown to the security system in typical embodiments, so that the security system has no direct way to use the user's algorithm as a measure of the user password's cracking difficulty. The illustrated method, however, provides an indirect measure of cracking difficulty by attempting to crack both passwords, inferring that the one that cracks first is less difficult to crack.

The method of FIG. 2 includes, if the user password cracks first (212), repeatedly carrying out the following steps so long as the user password continues to crack first: generating (214), in dependence upon the user security data (112), an alert password (208) having a reduced cracking difficulty (210) and attempting (216) to crack both the alert password (208) having a reduced cracking difficulty (210) and the user password (108) until one of them cracks. The fact that the user password cracks first implies that the process has not yet succeeded in generating (114) an alert password that is easier to crack than the user password. The method therefore proceeds by reducing the cracking difficulty, generating another alert password, and testing again until it finds an alert password easier to crack than the user password.

Generating (214 on FIG. 2) an alert password having a reduced cracking difficulty can be carried in a manner that is similar to the method of FIG. 3. That is, an exemplary method of generating an alert password having a reduced cracking difficulty includes selecting a reduced cracking difficulty, using, for example, a table such as the one shown at reference (310) of FIG. 3 and discussed above. In this context, a reduced cracking difficulty is a cracking difficulty that is less than, that is, easier than, a previous cracking difficulty. Methods of generating an alert password having a reduced cracking difficulty typically also include selecting a password generating algorithm in dependence upon the reduced cracking difficulty by, for example, taking them from a table organized according to cracking difficulty as discussed above in connection with table (310) of FIG. 3. Methods of generating an alert password having a reduced cracking difficulty typically also include generating an alert password by use of the selected algorithm by, for example, calling a program that implements the selected algorithm, calling a member method that implements the selected algorithm, and so on.

Figure 4:
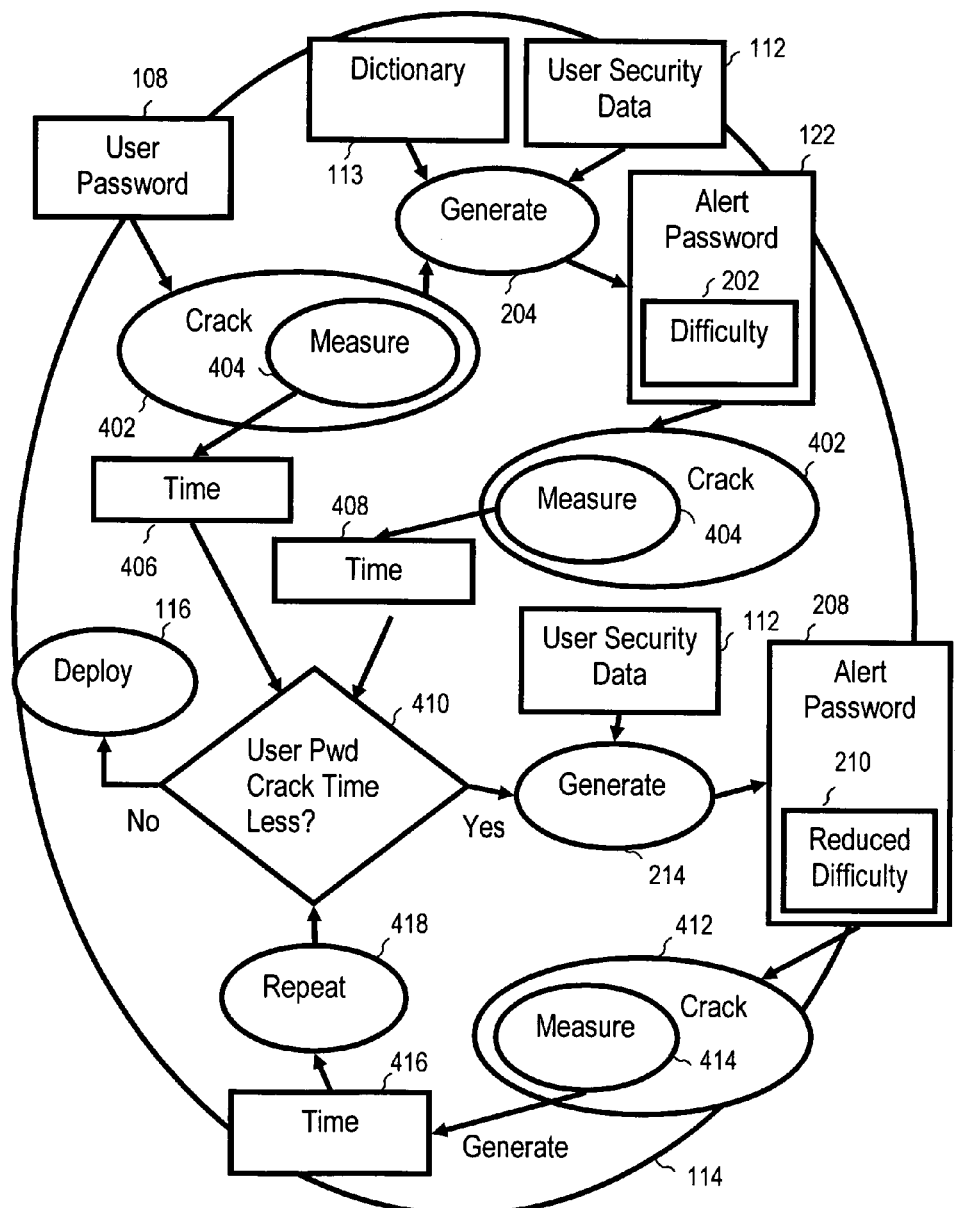
FIG. 4 sets forth a data flow diagram illustrating an additional exemplary method of generating an alert password that is easier to crack than a user password.

In some exemplary embodiments, for example, those in which user passwords are moderately difficult to crack, to be able to repeatedly attempt to crack only the alert passwords, thereby saving the data processing work of repeatedly attempting to crack the user password. Such a process can be implemented by cracking the user password once, measuring and storing the time required to crack it, then repeatedly cracking and measuring the cracking time of only the newly generated alert passwords until one is found to crack faster than the user password. FIG. 4 sets forth a data flow diagram illustrating an additional exemplary method of generating (114) an alert password that is easier to crack than the user password where the method includes cracking (402) the user password (108) and measuring (404) the time (406) required to crack the user password. The method of FIG. 4 includes generating (204), in dependence upon the user security data (112), an alert password (122) having a cracking difficulty (202), cracking (402) the alert password (122), and measuring (404) the time (408) required to crack the alert password. Generating (204) an alert password (122) having a cracking difficulty (202), in this example, is carried out in dependence upon upon user security data (112), in dependence upon a dictionary (113), or in other ways.

The method of FIG. 4 includes, if the time (406) required to crack the user password is less than (410) the time (408) required to crack the alert password, repeatedly (418) carrying out the following steps until the time required to crack the alert password is less than the time required to crack the user password: generating (214) an alert password (208) having a reduced cracking difficulty (210), cracking (412) the alert password (208) having a reduced cracking difficulty (210), and measuring (414) the time (416) required to crack the alert password (208) having a reduced cracking difficulty (210).

Figure 5:
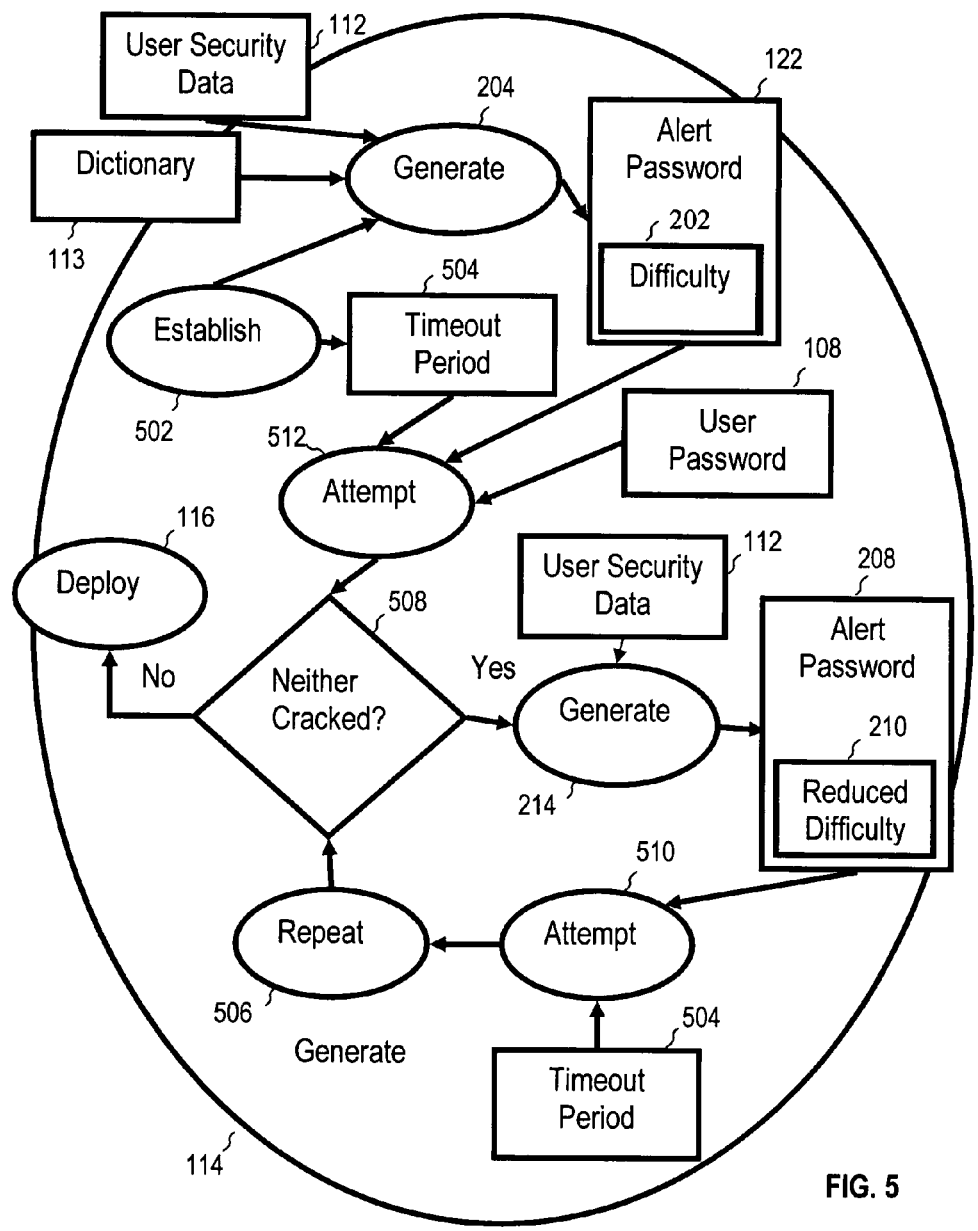
FIG. 5 sets forth a data flow diagram illustrating a further additional exemplary method of generating an alert password that is easier to crack than a user password.

FIG. 5 sets forth a data flow diagram illustrating a further additional exemplary method of generating (114) an alert password that is easier to crack than the user password, a method that also possesses (like the method of FIG. 4) the processing advantage of looping only against repeated attempts to crack alert passwords rather than looping against cracking both passwords, thereby operating more efficiently. The method of FIG. 5 includes establishing (502) a timeout period (504) generating (204) an alert password (122) having a cracking difficulty (202). Generating (204) an alert password (122) having a cracking difficulty (202), in this example, is carried out in dependence upon upon user security data (112), in dependence upon a dictionary (113), or in other ways. The method of FIG. 5 also includes attempting (512), during the timeout period (504), to crack both the alert password (122) and the user password (108). The method of FIG. 5 also includes, if neither password cracks (508) during the timeout period, repeatedly (506) carrying out the following steps until the alert password cracks during the timeout period: generating (214) an alert password (208) having a reduced cracking difficulty (210) and attempting (510) during the timeout period (504) to crack the alert password (208) having a reduced cracking difficulty (210).

When security system place attacker interactions in honeypots, it is useful to maintain as long as possible the impression that the attacker is logged onto a real system. If an alert password, easier to crack than a user password, is made too easy to crack, that increases the risk that an attacker will realize the attacker has been detected.

Figure 6:
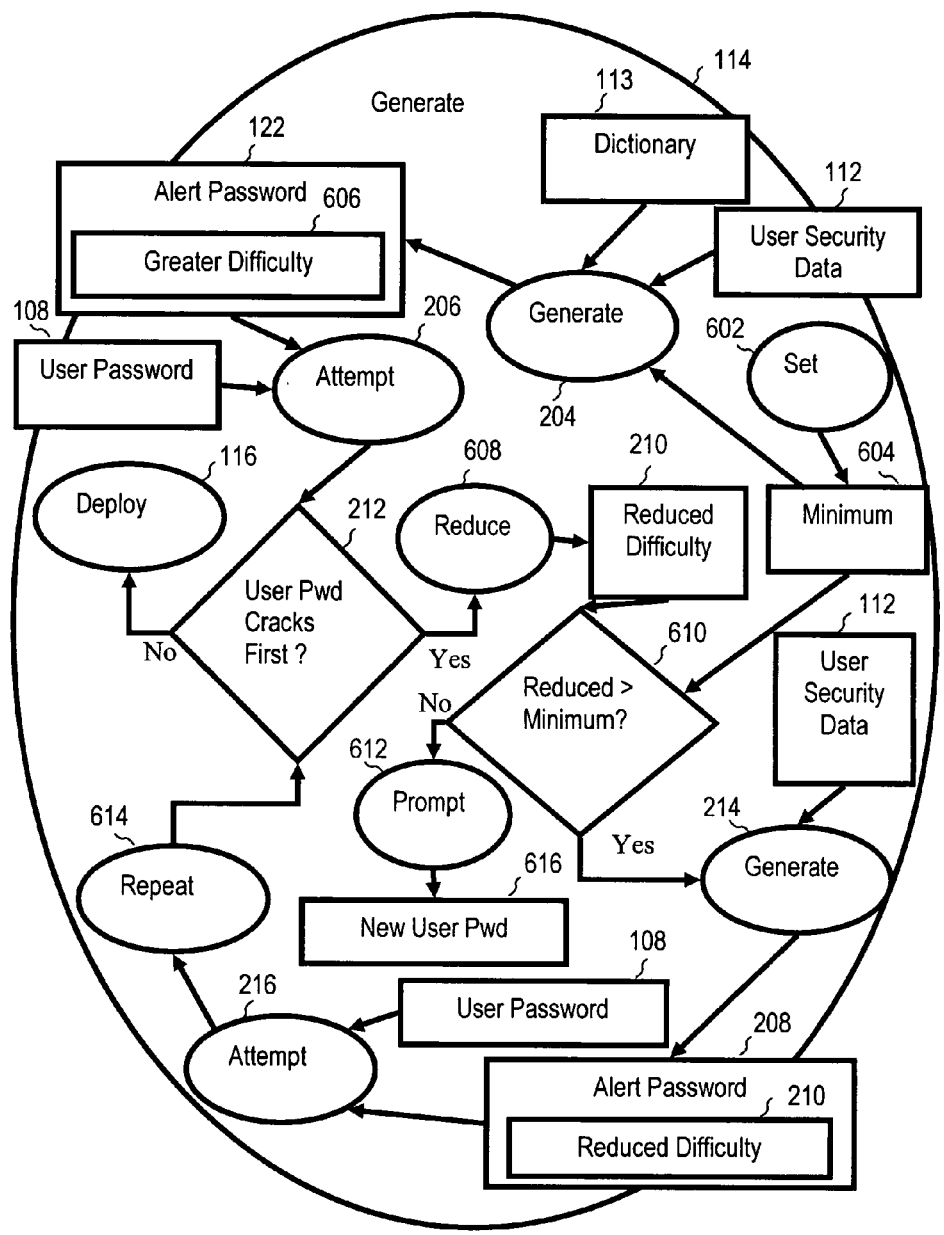
FIG. 6 sets forth a data flow diagram illustrating a still further method of generating an alert password that is easier to crack than a user password.

FIG. 6 sets forth a data flow diagram illustrating a still further method of generating (114) an alert password that is easier to crack than the user password. The method of FIG. 6 advantageously prevents generation of alert passwords that are too easy to crack by setting (602) a minimum cracking difficulty (604) and generating (204) an alert password (122) having a cracking difficulty (606) greater than the minimum cracking difficulty (604). The method of FIG. 6 also includes attempting (206) to crack both the alert password (122) and the user password (108) until at least one of them cracks. The method of FIG. 6 also includes, if the user password cracks first (212), repeatedly (614) carrying out the following steps so long as the user password continues to crack first (212) and a reduced cracking difficulty remains greater than the minimum cracking difficulty (610): reducing (608) the cracking difficulty (210), generating (214) an alert password (208) having the reduced cracking difficulty (210), and attempting (216) to crack both the alert password (208) having the reduced cracking difficulty (210) and the user password (108) until one of them cracks.

The method of FIG. 6 further also includes prompting (612) the user to enter a new user password having a greater cracking difficulty if the reduced cracking difficulty of the alert password becomes equal to or less than the minimum cracking difficulty (610). The fact that the method's processing loop eventually produces a reduced cracking difficulty of a generated alert password that is equal to or less than the minimum cracking difficulty implies that the cracking difficulty of the user password is too low. That is, the user password is revealed by this method in this circumstance as being so easy to crack that no alert password easier to crack than the user password can be generated with a cracking difficulty believable to an attacker. In this circumstance, in order to be able to generate an alert password easier to crack than the user password and also having a cracking difficulty likely to be believable to an attacker, it is useful to prompt the user to enter a user password more difficult to crack. The fact that the user password is so easy to crack probably means that the user created the user password using dictionary words or easily discoverable personal information. Prompting the user to enter a user password more difficult to crack in such embodiments advantageously includes prompting the user to create a user password using random combinations of letters, numbers, and special characters such as punctuation or control characters, such as, for example, *, !, @, #, $, %, &, and so on. Passwords having random combinations of letters, numbers, and special characters, and containing therefore no dictionary words or personal information, are more difficult to crack.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for detecting attacks on secured computer resources, the system comprising a computer processor, computer memory operatively coupled to the computer processor, and computer program instructions disposed in the computer memory that, upon being executed by the computer processor, cause the system to carry out the steps of:

selecting a cracking difficulty for an alert password as measured by a time it takes to crack the alert password;

selecting an algorithm for generating the alert password characterized by the cracking difficulty;

retrieving data for use in generating the alert password;

generating the alert password for a user having a user password protecting resources on a computer system;

determining whether the alert password is easier to crack than the user password, the determining including:

attempting to crack both the alert password and the user password until at least one of them cracks, and if the user password cracks first, repeatedly carrying out the following steps so long as the user password continues to crack first; generating an alert password having a reduced cracking difficulty; and attempting to crack both the alert password having a reduced cracking difficulty and the user password until one of them cracks; and deploying the alert password on the computer system for use in detecting password attacks on the protected resources.

2. The system of claim 1 further comprising computer program instructions that, upon being executed by the computer processor, cause the system to carry out the step of gathering user security data for the user, wherein generating an alert password that is easier to crack than the user password further comprises generating, in dependence upon the user security data, an alert password that is easier to crack than the user password.

3. A computer program product for detecting attacks on secured computer resources, the computer program product comprising:

a non-transitory recording medium; and computer program instructions recorded on the recording medium, the computer program instructions, upon being executed by a computer processor of a computer, causing the computer to carry out the steps of:

selecting a cracking difficulty for an alert password as measured by a time it takes to crack the alert password;

selecting an algorithm for generating the alert password characterized by the cracking difficulty;

retrieving data for use in generating the alert password;

generating the alert password for a user having a user password protecting resources on a computer system;

determining whether the alert password is easier to crack than the user password, the determining including:

cracking the user password and measuring the time required to crack the user password; cracking the alert password and measuring the time required to crack the alert password; if the time required to crack the user password is less than the time required to crack the alert password, repeatedly carrying out the following steps until the time required to crack the alert password is less than the time required to crack the user password; generating an alert password having a reduced cracking difficulty; cracking the alert password having a reduced cracking difficulty; and measuring the time required to crack the alert password having a reduced cracking difficulty; and deploying the alert password on the computer system for use in detecting password attacks on the protected resources.

4. The computer program product of claim 3 further comprising computer program instructions that upon being executed by the computer processor cause the computer to carry out the step of gathering user security data for the user, wherein generating an alert password that is easier to crack than the user password further comprises generating, in dependence upon the user security data, an alert password that is easier to crack than the user password.

5. A method for detecting attacks on secured computer resources, the method comprising:

selecting a cracking difficulty for an alert password as measured by a time it takes to crack the alert password;

selecting an algorithm for generating the alert password characterized by the cracking difficulty;

retrieving data for use in generating the alert password;

generating the alert password for a user having a user password protecting resources on a computer system;

determining whether the alert password is easier to crack than the user password, the determining including:

establishing a timeout period; attempting, during the timeout period, to crack both the alert password and the user password; and if neither password cracks during the timeout period, repeatedly carrying out the following steps until the alert password cracks during the timeout period; generating an alert password having a reduced cracking difficulty; and attempting during the timeout period to crack the alert password having a reduced cracking difficulty; and deploying the alert password on the computer system for use in detecting password attacks on the protected resources.

6. The method of claim 5 further comprising gathering user security data for the user, wherein generating an alert password that is easier to crack than the user password further comprises generating, in dependence upon the user security data, an alert password that is easier to crack than the user password.

7. The system of claim 1 further comprising:

setting a minimum cracking difficulty for the alert password; and accepting the alert password if it cracks before the user password and exceeds the minimum cracking difficulty.

8. The computer program product of claim 3 further comprising:

setting a minimum cracking difficulty for the alert password; and accepting the alert password if it is easier to crack than the user password and exceeds the minimum cracking difficulty.

9. The method of claim 5 wherein the timeout period is a first timeout period, the method further comprising:

establishing a second timeout period which is shorter than the first timeout period; and accepting the alert password if it cracks before expiration of the first timeout period and after expiration of the second timeout period.

10. The method of claim 5 wherein the minimum cracking difficulty is a first minimum cracking difficulty, the method further comprising:

setting a second minimum cracking difficulty which is easier to crack than the first minimum cracking difficulty; and accepting the alert password if it is harder to crack than the second minimum cracking difficulty and easier to crack than the first minimum cracking difficulty.

11. The system of claim 1, wherein said algorithm is a first algorithm and said cracking difficulty is a first cracking difficulty; and wherein the generating of the alert password having a reduced cracking difficulty further comprises selecting a second algorithm for generating the alert password characterized by a second cracking difficulty which takes less time to crack than said first cracking difficulty.

12. The computer program product of claim 3, wherein said algorithm is a first algorithm and said cracking difficulty is a first cracking difficulty; and wherein the generating of the alert password having a reduced cracking difficulty further comprises selecting a second algorithm for generating the alert password characterized by a second cracking difficulty which takes less time to crack than said first cracking difficulty.

13. The method of claim 5, wherein said algorithm is a first algorithm and said cracking difficulty is a first cracking difficulty; and wherein the generating of the alert password having a reduced cracking difficulty further comprises selecting a second algorithm for generating the alert password characterized by a second cracking difficulty which takes less time to crack than said first cracking difficulty.

\* \* \* \* \*